UNITED STATES PATENT OFFICE.

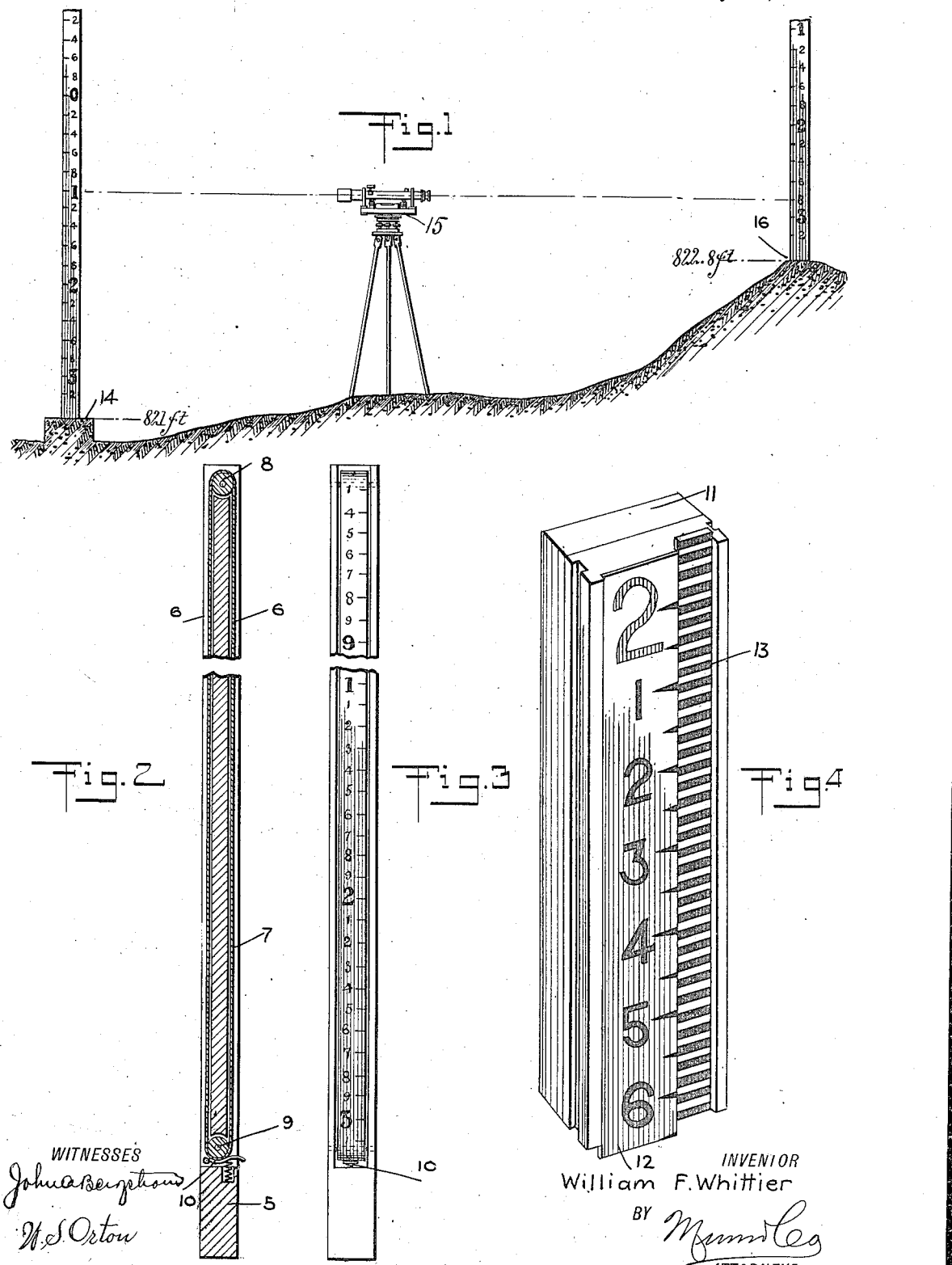

WILLIAM FRANCIS WHITTIER, OF DELAWARE, OHIO.

LEVELING-ROD.

1,147,060.  Specification of Letters Patent.  Patented July 20, 1915.

Application filed May 23, 1912. Serial No. 699,130.

*To all whom it may concern:*

Be it known that I, WILLIAM F. WHITTIER, a citizen of the United States, and a resident of Delaware, in the county of Delaware and State of Ohio, have invented a new and Improved Leveling-Rod, of which the following is a full, clear, and exact description.

My invention relates to leveling rods, and an object of my invention is to provide a leveling rod by which an elevation can be read directly on the same without computation. The ordinary rod now in general use has a scale marked off into linear units with the zero at the bottom and progressively numbered from the zero upward. In using the old forms of rods, it is customary to place the rod on the bench mark with the level in some convenient location relative thereto, and sight therethrough at the rod, in which case the cross-hairs of the level will bisect the rod, which reading will be the elevation of the cross-hairs above the bench mark; then by placing the rod on the elevation to be obtained and sighting the rod in its new position, the distance of the elevation below the cross-hairs will be indicated and the true elevation is obtained by subtracting the distance from the cross-hairs to the elevation from the elevation of the cross-hairs above the bench mark plus the given elevation of the bench mark. This computation takes up some material time, especially where the operation is repeated several hundreds of times a day.

I attain the above-outlined object by means of a rod resembling in construction rods now used in the art except that the linear scale is movable and numbered successively in increasing order downward from any point on the scale.

Reference is to be had to the accompanying drawings forming a part of this specification, in which similar characters of reference indicate corresponding parts in all the figures, and in which—

Figure 1 is a diagrammatic representation of my scale in position on a bench mark and elevation, with a conventional form of level therebetween; Fig. 2 is a vertical sectional elevation of a preferred embodiment; Fig. 3 is a face view of the same; and Fig. 4 is a modified form of my invention.

Referring more particularly to Figs. 2 and 3, my leveling rod comprises a supporting staff 5, preferably made of wood and of any suitable length, provided with recesses 6, 6 on opposite sides of one face thereof, adapted to receive an endless tape 7, which tape is mounted upon rollers 8 and 9 suitably journaled, respectively, adjacent the top and bottom of the rod, which tape is adapted to be held in position by any suitable means of brake 10. This tape has a scale thereon marked off into linear units, which are numbered in succeeding order downward from any point on the scale. In the drawings, this tape is represented as being twenty feet long, so that ten feet divided into tenths always show on the face of the rod, but it is to be understood that my invention does not depend upon any particular units of length, nor does it in any way depend upon the number of units marked on the scale nor the length of the scale, it only being necessary that there be a movable scale numbered progressively downward, and this may take the form of the modification shown in Fig. 4, in which the body portion 11 has a sliding scale 12 positioned in the front face thereof, which front face may also carry a vernier scale 13, if desired; in that case, but a small portion of the scale is shown.

In use, the rod is set on a bench mark 14 having a known elevation above sea level, say 821.0 feet and a level 15 is disposed in a convenient position relative thereto; then sighting through the level the scale on the rod is moved until the mark numbered 1.0 feet is on a line with the cross-hairs and the scale is locked in that position. It is understood that this reading in this case must have the prefix 82, making it 821.0 feet. In other words, the tape is rotated until the last digit of the number indicating the elevation of the bench mark is in alinement with the hairs in the level, then the locked rod is placed on the elevation, as shown at 16, and the number on the rod in alinement with the hairs in the level suffixed to the constant prefix, as in this case 82, gives the true elevation desired, which in the illustration is 822.8 as the 2.8 is in alinement with the hairs of the level 15.

Having thus described my invention, I claim as new and desire to secure by Letters Patent:

1. A leveling rod comprising a support, an endless scale mounted on said support, rollers over which said endless scale is located to move, a pivotally mounted lever having an arc-shaped portion, said pivotally mounted lever being at one end of the support and adjacent one of said rollers, and a spring pressing against said lever for causing said arc-shaped portion to normally press part of said scale, on said last mentioned roller for locking the scale against movement.

2. A leveling rod, comprising a support having recesses in opposing faces, rollers mounted at the upper and lower ends of the support, an imperforate endless tape passing around said rollers and marked off into linear units, said units being numbered successively in an increasing order downwardly from any point of the tape, and a pivoted and spring-pressed locking member for the tape, arranged adjacent one of the rollers and pressing said tape against the roller.

In testimony whereof I have signed my name to this specification in the presence of two subscribing witnesses.

WILLIAM FRANCIS WHITTIER.

Witnesses:
F. C. HIGLEY,
W. F. WALKER.